(12) United States Patent
Amini et al.

(10) Patent No.: US 11,206,412 B2
(45) Date of Patent: Dec. 21, 2021

(54) BAND STEERING FOR A LOW POWER DEVICE

(71) Applicant: NETGEAR, INC., San Jose, CA (US)

(72) Inventors: Peiman Amini, Mountain View, CA (US); Joseph Amalan Arul Emmanuel, Cupertino, CA (US)

(73) Assignee: NETGEAR, INC., San Jose, CA (US)

( * ) Notice: Subject to any disclaimer, the term of this patent is extended or adjusted under 35 U.S.C. 154(b) by 63 days.

(21) Appl. No.: 16/278,617

(22) Filed: Feb. 18, 2019

(65) Prior Publication Data
US 2019/0261370 A1 Aug. 22, 2019

Related U.S. Application Data

(60) Provisional application No. 62/633,017, filed on Feb. 20, 2018.

(51) Int. Cl.
*H04N 19/166* (2014.01)
*H04N 19/103* (2014.01)
(Continued)

(52) U.S. Cl.
CPC .......... *H04N 19/166* (2014.11); *G06F 9/542* (2013.01); *G06K 9/00771* (2013.01); *G06T 7/20* (2013.01); *G07C 9/37* (2020.01); *G08B 3/10* (2013.01); *G08B 3/1016* (2013.01); *G08B 5/223* (2013.01); *G08B 13/191* (2013.01);
(Continued)

(58) Field of Classification Search
CPC .... H04N 19/166; H04B 17/309; H04W 36/30
See application file for complete search history.

(56) References Cited

U.S. PATENT DOCUMENTS

| 8,086,252 B2 | 12/2011 | Luers |
| 2005/0021724 A1 | 1/2005 | Kung et al. |

(Continued)

FOREIGN PATENT DOCUMENTS

| CN | 1618208 A | 5/2005 |
| CN | 101070763 A | 11/2007 |

(Continued)

OTHER PUBLICATIONS

Qi, LV, "Research on Measuring and Control Technology for the Intellectualization and Energy Saving in Green Home", China Master's Theses Full-text Database; I136-482, Dec. 15, 2011, 137 pages.

(Continued)

*Primary Examiner* — Siming Liu
(74) *Attorney, Agent, or Firm* — Perkins Coie LLP

(57) ABSTRACT

An access point is configured to communicate with a wireless client device over a plurality of wireless communication channels. The wireless client device has an active operation state and a standby operation state. The access point detects a property of each of a first wireless communication channel and a second wireless communication channel, and applies a policy to the detected properties to select one of the first wireless communication channel and the second wireless communication channel. While the wireless client device is in the active operation state, the access point steers the client device to communicate with the access point over the selected channel.

20 Claims, 5 Drawing Sheets

(51) Int. Cl.
| | |
|---|---|
| H04N 19/124 | (2014.01) |
| H04N 19/156 | (2014.01) |
| H04N 19/184 | (2014.01) |
| H04N 19/40 | (2014.01) |
| H04N 19/42 | (2014.01) |
| H04B 17/318 | (2015.01) |
| H04B 17/391 | (2015.01) |
| H04N 5/232 | (2006.01) |
| H05B 47/19 | (2020.01) |
| G07C 9/37 | (2020.01) |
| H05B 47/105 | (2020.01) |
| G06F 9/54 | (2006.01) |
| G06K 9/00 | (2006.01) |
| G06T 7/20 | (2017.01) |
| G08B 3/10 | (2006.01) |
| G08B 5/22 | (2006.01) |
| G08B 13/191 | (2006.01) |
| G08B 13/193 | (2006.01) |
| G08B 13/196 | (2006.01) |
| G08B 21/18 | (2006.01) |
| G08B 27/00 | (2006.01) |
| G08B 29/18 | (2006.01) |
| H04L 1/00 | (2006.01) |
| H04L 5/00 | (2006.01) |
| H04L 12/26 | (2006.01) |
| H04L 29/06 | (2006.01) |
| H04L 29/08 | (2006.01) |
| H04N 5/247 | (2006.01) |
| H04N 7/12 | (2006.01) |
| H04N 7/18 | (2006.01) |
| H04N 17/00 | (2006.01) |
| H04W 24/08 | (2009.01) |
| H04W 24/10 | (2009.01) |
| H04W 28/02 | (2009.01) |
| H04W 36/00 | (2009.01) |
| H04W 36/30 | (2009.01) |
| H04W 52/02 | (2009.01) |
| H04W 72/04 | (2009.01) |
| H04N 7/14 | (2006.01) |
| H04N 19/00 | (2014.01) |

(52) U.S. Cl.
CPC ....... *G08B 13/193* (2013.01); *G08B 13/1966* (2013.01); *G08B 13/19656* (2013.01); *G08B 13/19669* (2013.01); *G08B 13/19695* (2013.01); *G08B 21/182* (2013.01); *G08B 27/006* (2013.01); *G08B 29/183* (2013.01); *H04B 17/318* (2015.01); *H04B 17/391* (2015.01); *H04L 1/0003* (2013.01); *H04L 1/0009* (2013.01); *H04L 1/0017* (2013.01); *H04L 1/0033* (2013.01); *H04L 5/0053* (2013.01); *H04L 43/0858* (2013.01); *H04L 43/12* (2013.01); *H04L 43/16* (2013.01); *H04L 65/4084* (2013.01); *H04L 65/608* (2013.01); *H04L 65/80* (2013.01); *H04L 67/1093* (2013.01); *H04N 5/23206* (2013.01); *H04N 5/23227* (2018.08); *H04N 5/23254* (2013.01); *H04N 5/247* (2013.01); *H04N 7/12* (2013.01); *H04N 7/183* (2013.01); *H04N 17/002* (2013.01); *H04N 19/103* (2014.11); *H04N 19/124* (2014.11); *H04N 19/156* (2014.11); *H04N 19/184* (2014.11); *H04N 19/40* (2014.11); *H04N 19/42* (2014.11); *H04W 24/08* (2013.01); *H04W 24/10* (2013.01); *H04W 28/021* (2013.01); *H04W 36/0011* (2013.01); *H04W 36/30* (2013.01); *H04W 52/0245* (2013.01); *H04W 52/0261* (2013.01); *H04W 72/042* (2013.01); *H04W 72/0453* (2013.01); *H05B 47/105* (2020.01); *H05B 47/19* (2020.01); *G06T 2207/30232* (2013.01); *G06T 2207/30241* (2013.01); *H04N 7/147* (2013.01); *H04N 7/181* (2013.01); *H04N 19/00* (2013.01)

(56) References Cited

U.S. PATENT DOCUMENTS

| | | |
|---|---|---|
| 2006/0094369 A1 | 5/2006 | Nguyen |
| 2009/0143078 A1 | 6/2009 | Tu et al. |
| 2010/0081447 A1 | 4/2010 | Qi et al. |
| 2010/0214943 A1 | 8/2010 | Immendorf et al. |
| 2011/0128389 A1 | 6/2011 | Maeda et al. |
| 2011/0222449 A1 | 9/2011 | Goldberg et al. |
| 2012/0287879 A1 | 11/2012 | Nentwig |
| 2013/0107816 A1 | 5/2013 | Iraji et al. |
| 2013/0120597 A1 | 5/2013 | Sakai et al. |
| 2013/0322329 A1 | 12/2013 | Visuri et al. |
| 2013/0331097 A1 | 12/2013 | Kang et al. |
| 2014/0044113 A1 | 2/2014 | Chu |
| 2015/0029333 A1 | 1/2015 | Ko et al. |
| 2015/0154786 A1 | 6/2015 | Furukawa et al. |
| 2015/0333965 A1 | 11/2015 | Lee et al. |
| 2016/0014679 A1 | 1/2016 | Taneja |
| 2016/0134932 A1 | 5/2016 | Karp et al. |
| 2016/0286500 A1* | 9/2016 | Zur ............... H04L 67/104 |
| 2016/0295172 A1 | 10/2016 | Cuddeback et al. |
| 2017/0142728 A1 | 5/2017 | Tsai et al. |
| 2017/0163513 A1 | 6/2017 | Kim et al. |
| 2017/0163944 A1* | 6/2017 | Jeong ............... G01J 5/0025 |
| 2017/0178475 A1 | 6/2017 | Renkis |
| 2017/0257261 A1 | 9/2017 | Monnerat |
| 2017/0278368 A1 | 9/2017 | Burke |
| 2017/0303138 A1 | 10/2017 | Barmettler et al. |
| 2018/0109999 A1 | 4/2018 | Finnegan |
| 2019/0045407 A1 | 2/2019 | Logan et al. |
| 2019/0174383 A1* | 6/2019 | Zhang ............ H04W 36/08 |
| 2020/0145890 A1* | 5/2020 | Ma ................ H04W 36/20 |
| 2020/0186227 A1* | 6/2020 | Reider ............ H04L 41/16 |

FOREIGN PATENT DOCUMENTS

| | | |
|---|---|---|
| CN | 101547342 A | 9/2009 |
| CN | 102523435 A | 6/2012 |
| CN | 102547247 A | 7/2012 |
| CN | 102811370 A | 12/2012 |
| CN | 103369318 A | 10/2013 |
| CN | 103582168 A | 2/2014 |
| CN | 103945438 A | 7/2014 |
| CN | 104919788 A | 9/2015 |
| CN | 205028060 U | 2/2016 |
| CN | 105636078 A | 6/2016 |
| CN | 105792295 A | 7/2016 |
| CN | 105898471 A | 8/2016 |

OTHER PUBLICATIONS

Yang, Chaofan, et al., "Enhancing Industrial Video Surveillance over Wireless Mesh", 2016 25th International Conference on Computer Communication and Networks, 44 pages.

* cited by examiner

| CHANNEL NUMBER | LOWER FREQUENCY MHZ | CENTER FREQUENCY MHZ | UPPER FREQUENCY MHZ |
|---|---|---|---|
| 1 | 2401 | 2412 | 2423 |
| 2 | 2406 | 2417 | 2428 |
| 3 | 2411 | 2422 | 2433 |
| 4 | 2416 | 2427 | 2438 |
| 5 | 2421 | 2432 | 2443 |
| 6 | 2426 | 2437 | 2448 |
| 7 | 2431 | 2442 | 2453 |
| 8 | 2436 | 2447 | 2458 |
| 9 | 2441 | 2452 | 2463 |
| 10 | 2446 | 2457 | 2468 |
| 11 | 2451 | 2462 | 2473 |
| 12 | 2456 | 2467 | 2478 |
| 13 | 2461 | 2472 | 2483 |
| 14 | 2473 | 2484 | 2495 |

| CHANNEL NUMBER | FREQUENCY MHZ |
|---|---|
| 36 | 5180 |
| 40 | 5200 |
| 44 | 5220 |
| 48 | 5240 |
| 52 | 5260 |
| 56 | 5280 |
| 60 | 5300 |
| 64 | 5320 |
| 100 | 5500 |
| 104 | 5520 |
| 108 | 5540 |
| 112 | 5560 |
| 116 | 5580 |
| 120 | 5600 |
| 124 | 5620 |
| 128 | 5640 |
| 132 | 5660 |
| 136 | 5680 |
| 140 | 5700 |
| 149 | 5745 |
| 153 | 5765 |
| 157 | 5785 |
| 161 | 5805 |
| 165 | 5825 |

BAND STEERING FOR A LOW POWER DEVICE

CROSS-REFERENCE TO RELATED APPLICATION

This application claims the benefit of U.S. Provisional Patent Application No. 62/633,017, filed Feb. 20, 2018, which is incorporated herein by reference in its entirety.

TECHNICAL FIELD

This disclosure relates to band steering for a low-power wireless device.

BACKGROUND

Wireless access points enable computing devices to communicate with other devices in a network. A computing device can send data to an access point for transmission over the network, or receive data from the access point that originated from another device in the network. The access point and computing device may communicate with one another via a plurality of communication channels, each of which represents a logical coupling between the access point and the computing device and specifies a range of frequencies for signals transmitted to or from the devices.

Typically, the channel used for communication between an access point and computing device is selected by the access point. The computing device may, for example, send probe requests to the access point on multiple channels, while the access point may select a channel for communication and respond to the probe request only on the selected channel to cause the computing device to communicate via the selected channel. To ensure reliable communication between the computing device and access point, the computing device may send the access point frequent probe requests, such as once per second. These frequent probe requests enable the access point to quickly select a new channel if communications via the original channel experience interference or delays. However, each probe request and channel switch consumes power at the computing device. For low-power devices, such as those operating on a battery without a dedicated power line, frequently switching communications channels can consume excessive power and reduce the amount of time each battery charge can last.

DETAILED DESCRIPTION

Figures 1A, 1B, 1C:
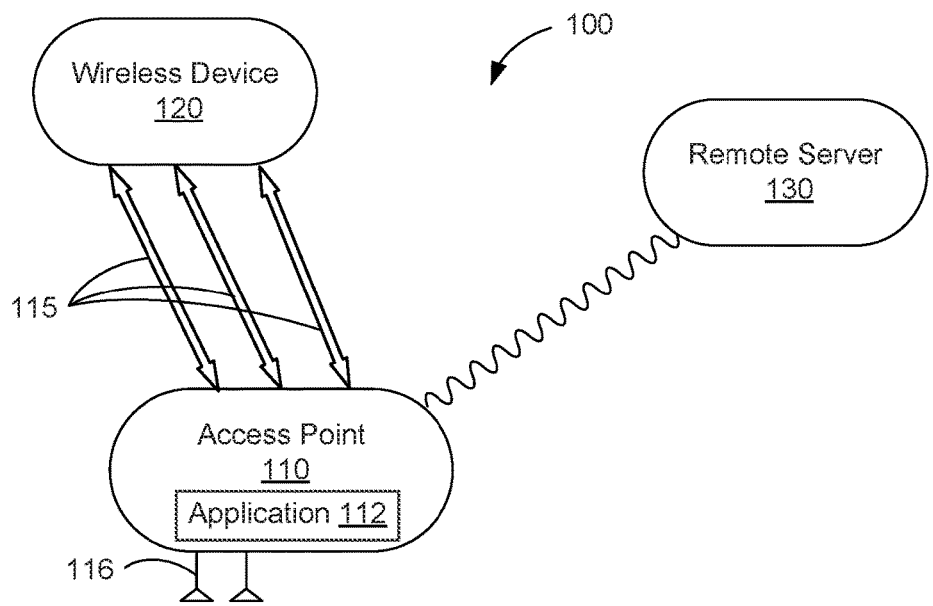
FIG. 1A is a representative computer network environment within which one or more embodiments disclosed herein may be implemented.
FIG. 1B is a chart listing frequency ranges for channels in a 2.4 GHZ band.
FIG. 1C is a chart listing center frequencies for channels in a 5 GHz band.

An access point communicates with wireless client device over one of a plurality of available radio frequency communication channels. The access point selects the communication channel based on properties of the channel or attributes of the data that is to be communicated over the channel. Although the wireless device may be any device capable of communication over a network, various embodiments of a wireless device are described herein with respect to a video camera that is capable of capturing video and transmitting the video over a wireless network to a remote access point and/or a server. The video camera may be used, for example, as a home or office security camera that remains in a substantially static position (e.g., at a front door). It is observed here that, when the position of the device (e.g., a wireless security camera) does not change frequently, the device need not connect to and disconnect from wireless access points as frequently as compared to a more mobile device, for which typical wireless communication standards are designed. Furthermore, a specialized client device such as a video camera may communicate with the access point infrequently. For example, a video camera triggered by motion may turn on to capture and transmit video data for only a few minutes each day, while otherwise operating in a standby or low-power state. To reduce an amount of power consumed by the client device, the access point can implement various techniques disclosed here, for example, limiting how frequently the access point selects a communication channel from the plurality of available communication channels and causes the client device to switch to a different communication channel. In certain examples, the access point may switch the client device from a first channel to a second channel when the client device is active, but not when the client device is in a standby state. The access point may additionally or alternatively use channel properties detected by the client device, such as a measurement by the client device of interference on a particular channel, to select the communication channel.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure.

The term "coupled" as used herein means connected directly to or connected through one or more intervening components or circuits. Any of the signals provided over various buses described herein may be time-multiplexed with other signals and provided over one or more common buses. In addition, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication (e.g., a network) between components. The present embodiments are not to be construed as limited to specific examples described herein but rather to include within their scope all embodiments defined by the appended claims.

FIG. 1A is a representative computer network environment 100 within which some embodiments may be implemented. The environment 100 includes an access point 110, a wireless device 120, and a remote server 130. Additional components not shown in FIG. 1A may also be included in the environment 100. For example, the environment 100 may further include intervening devices (e.g., switches, routers, hubs, etc.) among the access point 110, the remote server 130, and the wireless device 120. Furthermore, the environment 100 may include multiple access points 110, remote servers 130, and/or wireless devices 120.

The wireless device 120 is a computing device communicatively coupled to the access point 110 and remote server 130. In one embodiment, the wireless device 120 is a camera configured to capture and transmit video data. The wireless device 120 can be any suitable network-connected cameras (or "IP cameras"). For example, the wireless device 120 can operate as a security camera in a home or office. In these cases, the wireless device 120 may be relatively static, remaining in approximately the same physical position at most times. It is contemplated that additional examples of the devices 120 equipped with video and audio recording technology can include computing or mobile devices including, for example, smartphones, tablet computers, laptops, personal digital assistants (PDAs), or the like. Additional examples of the devices 120 can include home sensors (e.g., motion detection sensors and temperature sensors) that can connect to the Internet).

The wireless device 120 may be configured to operate in an active, higher-power state and a standby, lower-power state. In the active state, the wireless device 120 can generate or capture data, such as video data, and communicate with other devices. In the standby state, the wireless device 120 may reduce power consumption by not communicating with other devices and turning off one or more components such as a camera and a main processor. When in the standby state, the wireless device 120 also does not send channel probes to the access point 110.

The amount of time the wireless device 120 is in the active state may be relatively low compared to the amount of time the wireless device 120 is in the standby state. For example, the wireless device 120 may remain idle until triggered to capture video data by an input, such as a user input or input from a motion detector. The wireless device 120 may also have a predetermined wake interval, at which time the device switches from the standby state to the active state to check network conditions, transmit any stored data to the access point 110, or perform other tasks. The wake interval can be, for example, eight hours, such that the device 120 becomes active after eight hours if no triggering input has been received in that interval.

The access point 110 enables the wireless device 120 to exchange data to and from the remote server 130. Although not shown for simplicity, the access point 110 may include one or more processors, which may be general-purpose processors or may be application-specific integrated circuitry that provides arithmetic and control functions to implement the techniques disclosed herein on the access point 110. The processor(s) may include a cache memory (not shown for simplicity) as well as other memories (e.g., a main memory, and/or non-volatile memory such as a hard-disk drive or solid-state drive). In some examples, cache memory is implemented using SRAM, main memory is implemented using DRAM, and non-volatile memory is implemented using Flash memory or one or more magnetic disk drives. According to some embodiments, the memories may include one or more memory chips or modules, and the processor(s) on the access point 110 may execute a plurality of instructions or program codes that are stored in its memory. Some or all of the instructions or program codes executed by the processor can be collectively represented as an application 112. The application 112, when executed by the processor, can manage communication channels used by the access point 110 to communicate with the wireless device 120.

The wireless device 120 can electronically couple to and communicate with the access point 110 wirelessly via a plurality of available communications channels 115. Although only three channels 110 are shown in FIG. 1A, the wireless device 120 and access point 110 may be configured to communicate by any number of channels 115. Each channel 115 represents frequency for signals transmitted between the wireless device 120 and access point 110. The channels 115 may be allocated within one or more frequency bands defining a range of signal frequencies, such as a 2.4 GHz band (including frequencies from 2.4 GHz to 2.5 GHz) and a 5 GHz band (including frequencies from 5 GHz to 6 GHz). FIG. 1B is a chart listing frequency ranges for each of fourteen channels allocated to the 2.4 GHz band, and FIG. 1C is a chart listing center frequencies for each of 24 channels allocated to the 5 GHz band. Some of the channels shown in FIGS. 1B and 1C may be available only in some geographic regions, while other geographic regions may use different or additional channels. The channels 115 may include, by way of example, three channels associated with the 2.4 GHz band: one centered at 2412 MHz (channel 1 in FIG. 1B), one centered at 2437 MHz (channel 6), and one centered at 2462 MHz (channel 11). Similarly, the 5 GHz band may include a plurality of channels distributed across the frequency range defined for the band. One or more of the channels 115 may be allocated to radar systems (referred to as a "DFS channel"), and the wireless device 120 may employ dynamic frequency selection (DFS) to use these channels. When operating in a DFS mode, the wireless device 120 monitors channels for radar signals and, if a signal is detected, automatically switches to another channel to reduce interference with the radar signals.

The access point 110 communicates with the wireless device 120 on one of the channels 115 by transmitting a signal at the channel frequency via an antenna 116 or receiving signals at the channel frequency via the antenna 116. The access point 110 can include multiple antennas 116 configured to receive or transmit data on different channels 115. For example, the access point 110 may have a first antenna 116 configured to communicate on a channel associated with the 2.4 GHz band, while a second antenna 116 is configured to communicate on a channel associated with the 5 GHz band.

The access point 110 can select a particular channel to use to communicate with the wireless device 120 and steer the wireless device 120 to the selected channel. To perform the band steering, the access point 110 listens for probes sent by the wireless device 120 on each available channel 115 and responds to the probe on the selected channel. When the wireless device 120 receives the response, the wireless device 120 may transmit future communications over the selected channel.

Communications between the wireless device 120 and access point 110 can use, for example, the IEEE 802.11 family of standards (e.g., Wireless LAN) and/or other suitable types of area network technologies, such as competing or alternative standards to the IEEE 802.11 family of standards (e.g., WiMAX), and can include any suitable intervening wireless network devices including, for example, base stations, routers, gateways, hubs, or the like. Depending on the embodiments, the network technology connecting between the wireless devices 120 and the access point 110 can include other suitable wireless standards such as the well-known Bluetooth communication protocols or near field communication (NFC) protocols. In some embodiments, the network technology between the devices 120 and access point 110 can include a customized version of WLAN, Bluetooth, or customized versions of other suitable wireless technologies.

The remote server 130 includes one or more computing devices remote from the wireless device 120 and capable of communicating over a network. The wireless device 120 may transmit data to the remote server 130 for storage or use of the data or to enable a user to access the data. For example, the remote server 130 may be a computing device used by a user to view video data captured by the wireless device 120 or to store and analyze data captured or generated by the wireless device 120. As another example, the remote server 130 can include one or more storage devices associated with a cloud storage service and configured to store the data received from the wireless device 120.

In some embodiments, the access point 110 and the remote server 130 may be coupled wirelessly (e.g., which may include employing an IEEE 802.11 wireless network, or a data traffic network based on wireless telephony services such as 3G, 3.5G, 4G Long-Term Evolution (LTE) and the like). The technologies supporting the communications between the access point 110 and the remote server 130 may include Ethernet (e.g., as described in IEEE 802.3 family of standards) and/or other suitable types of area network technologies, such as competing or alternative standards to the IEEE 802.11 family of standards (e.g., WiMAX). Examples of different wireless protocols in the IEEE 802.11 family of standards can include IEEE 802.11a, IEEE 802.11b, IEEE 802.11n, IEEE 802.11ac, IEEE 802.11af, IEEE 802.11ah, and IEEE 802.11ad.

Figure 2:
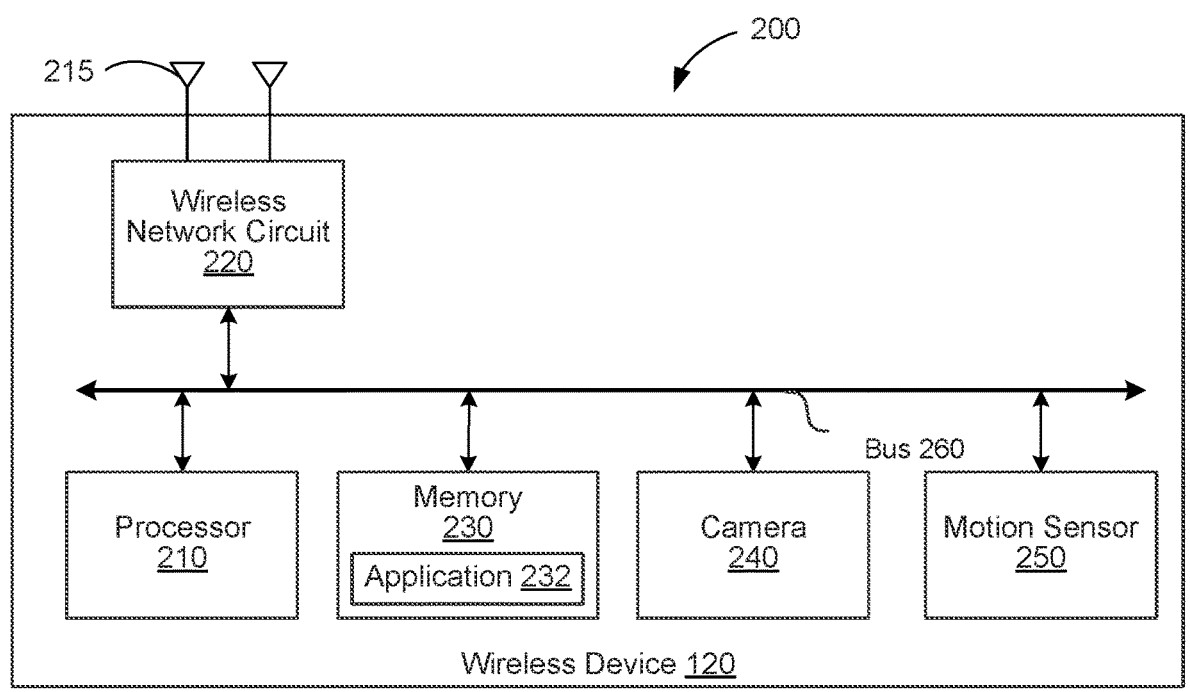
FIG. 2 is a block diagram illustrating components of the wireless device, according to some embodiments.

FIG. 2 is a block diagram illustrating components of the wireless device 120, according to one embodiment. As shown in FIG. 2, the wireless device 120 can include a processor 210, one or more antennas 215, a wireless network circuit 220, a memory 230, a camera 240, and a motion sensor 250, which may communicate with one another via one or more buses 260.

The memory 230 is a machine-readable medium including volatile or non-volatile memory devices. One or more memory devices of the memory 230 may be integrated within the wireless device 120, for example as embedded memory. The memory 230 may additionally or alternatively include an external or removable memory device, such as a secure digital (SD) card. The memory 230 can store instructions for execution by the processor 210, as well as video data or other data generated by the wireless device 120. Some or all of the instructions executable by the processor 210 can be collectively represented as an application 232. The application 232 may communicate with the application 112 executed by the access point 110.

The wireless network circuit 220 enables wireless communications between the wireless device 120 and the access point 110. The wireless network circuit 220 generates signals for transmission to the access point 110 by an antenna 215, or receives signals that are detected at the antenna 215.

The camera 240 captures video data. Video capture may be initiated by an input, such as a user input or a motion input detected by the motion sensor 250.

Figure 3:
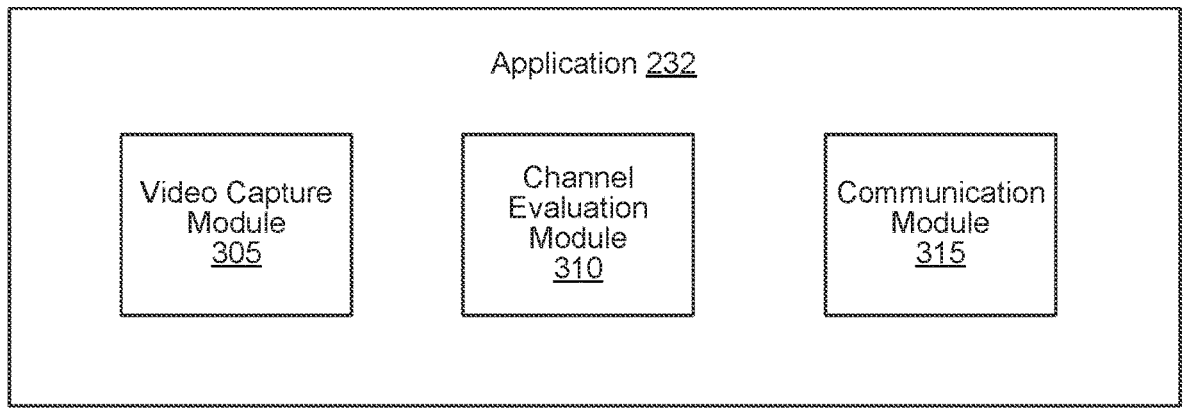
FIG. 3 is a block diagram illustrating functional modules executable by a wireless device, according to some embodiments.

FIG. 3 is a block diagram illustrating functional modules within the application 232 and executable by the wireless device 120, according to one embodiment. The modules shown in FIG. 3 may include software stored in the memory 230 and executable by the processor 210. In one embodiment, the wireless device 120 executes a video capture module 335, a channel evaluation module 310, and a communication module 315. Other embodiments may include additional, fewer, or different modules, and functionality may be distributed differently between the modules.

The video capture module 305 controls the camera 240 to capture video data. Video data may be captured at a fixed or variable frame rate. The video capture module 305 may encode or compress the video data for storage or transmission using any of a variety of codecs, such as H.264 or H.265. The video capture module 305 may initiate video capture in response to a specified input, such as an input by a user or detection of motion. For example, if the video capture module 305 receives a signal from the motion sensor 250 indicating that motion was detected within a field of view of the camera 240, the video capture module 305 turns on the camera 240 to capture video data or begins storing video data captured by the camera 240. The video capture module 305 may capture video data for a specified length of time, such as ten seconds, in response to each motion incident. Similarly, if video capture is initiated in response to a user input, the video capture module 305 may capture video data for a specified period of time, or may capture video data until a second user input to end video capture is received.

The video capture module 305 may store video data to the wireless device 120 or transmit the data to an external device, such as the remote server 130. In one embodiment, the video capture module 305 identifies an amount of storage available to the wireless device 120 in the memory 230 and/or external storage device. The video capture module 305 may determine the amount of storage periodically, for example after ending video capture or at specified intervals of time (e.g., once per hour). If the available storage is greater than a threshold, the video capture module 305 may store video data to the memory and/or external storage device.

The video capture module 305 may additionally or alternatively transmit video data to the remote server 130 via the access point 110. Video data may be transmitted in substantially real time as it is captured. For example, the video capture module 305 may encode and live stream data to the remote server 130 as the data is recorded. Video data may alternatively be transmitted at predetermined frequencies or selected times. In one embodiment, video data is transmitted if the available storage on the wireless device 120 is less than a threshold. For example, if the video capture module 305 detects that the available storage is below the threshold, any newly captured video data may be transmitted to the remote server 130 rather than stored at the wireless device 120. Alternatively, if the available storage is less than the threshold, older video data may be transmitted to the remote server 130 to provide space for newly captured video data. In another embodiment, the video capture module 305 receives information about the communication channels 115 and determines whether to store the video data based on the received information. Such information can include a capacity of the channel, latency of the channel, frequency of the channel, or other characteristics. For example, if a channel 115 has capacity below a specified threshold, the video capture module 305 may store the video data in the memory 230 until the channel capacity increases. In yet another embodiment, the video capture module 305 transmits any video data stored by the wireless device 120 to the remote server 130 at a predetermined frequency, such as once per day or once per week.

The video capture module 305 may adjust attributes of video data depending on whether the data is first stored by the wireless device 120 or transmitted to the remote server 130. For example, the video capture module 305 may record video data at a lower resolution when the video data is livestreamed to the remote server 130 and at a higher resolution when the video data is stored by the wireless device 120 before transmission. Similarly, the video capture module 305 may record shorter videos if the data is stored locally and longer videos if the data is transmitted live to the remote server 130.

The channel evaluation module 310 measures properties of the communication channels 115 between the wireless device 120 and the access point 110. The measured properties may include channel interference detected at the antenna 215 of the wireless device 120, a signal strength on the channel, capacity of the channel, or a number of dropped packets on the channel. Signal strength may be measured by a received signal strength indicator (RSSI), decibels relative to a milliwatt (dBm), or other metric, and the channel evaluation module 310 may measure the signal strength for one or both of a signal transmitted from the wireless device 120 to the access point 110 and a signal transmitted from the access point 110 to the wireless device 120. The channel capacity can represent a rate at which data can be communicated over the channel while maintaining an error probability below a specified threshold. When measuring the number of dropped packets, the channel evaluation module 310 may measure an absolute number of packets lost (e.g., a number lost during a given transmission) or a rate of packet loss (e.g., a number of packets dropped over a specified period of time).

The communication module 315 manages data captured by the wireless device 120, including communicating data to and receiving data from the access point 110 and determining whether to store captured data locally. The communication module 315 can also communicate with the application 112 to steer the wireless device 120 to a channel 115 selected by the access point 110. For example, the communication module 315 can transmit probes to the access point 110 on each of the channels 115 and listen for probe responses on the channels 115.

Some portions of the application 232 may be executed by a low power processor with limited functionality rather than the main processor 210. For example, the channel evaluation module 310 can cause a low power processor to detect channel properties while the main processor 210 is in a standby mode.

Figure 4:
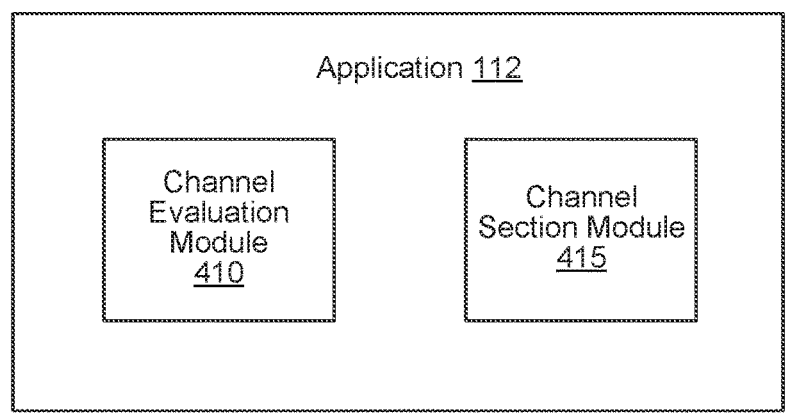
FIG. 4 is a block diagram illustrating functional modules executable by an access point, according to some embodiments.

FIG. 4 is a block diagram illustrating functional modules within the application 112 and executable by the access point 110, according to one embodiment. The modules shown in FIG. 4 may include computer program instructions that are executable by a processor of the access point 110. In one embodiment, the access point 110 executes a channel evaluation module 410 and a channel selection module 415. Other embodiments may include additional, fewer, or different modules, and functionality may be distributed differently between the modules.

The channel evaluation module 410, similar to the channel evaluation module 310 executed by the wireless device 120, can measure properties of the communication channels 115 between the wireless device 120 and the access point 110. The measured properties may include channel interference detected at one or more antennas associated with the access point 110, a signal strength on the channel, capacity of the channel, or a number of dropped packets on the channel.

The channel selection module 415 applies a policy to select a channel 115 for communicating data to or from the wireless device 120. The channel 115 may be selected based on properties of each available channel, attributes of the data, heuristics, or any combination thereof, and each policy specifies how the channel selection module 415 is to select the channel 115 based on these features.

In one embodiment, the channel selection module 415 applies a policy that gives preference to a higher frequency channel over a lower frequency channel. For example, the channel selection module 415 may select a channel associated with the 5 GHz frequency band whenever available, even if a channel associated with the 2.4 GHz band is also available.

The channel selection module 415 may apply a policy that uses an interference measurement associated with each of a plurality of channels 115 to select the channel. In one embodiment, the channel selection module 415 selects a channel if interference measured on the channel at the access point 110 is less than a threshold. The channel selection module 415 may also use interference measured at the wireless device 120 to select the channel. For example, the channel selection module 415 may select a channel if neither the interference measured at the access point 110 nor the interference measured at the wireless device 120 exceeds a specified threshold.

The channel selection module 415 may predict an amount of interference on each channel 115 by a supervised or unsupervised machine learning model, and use the predicted interference to select the channel 115. The model may generate a function relating the interference on a channel to factors such as time of day, day of the week, or type of data. Using the generated function, the channel selection module 415 can predict the amount of interference expected on each of a plurality of channels at a specified time and select a channel 115 that is most likely to have a low interference.

The channel selection module 415 may apply a policy that selects a channel 115 based on signal strength measured over the channel. For example, the channel selection module 415 selects a channel if both an uplink signal strength (e.g., for signals transmitted from the wireless device 120 to the access point 110) and a downlink signal strength (e.g., for signals transmitted from the access point 110 to the wireless device 120) are greater than respective thresholds. As another example, a policy may specify that, because the wireless device 120 is a camera that transmits significantly more data to the access point 110 than it receives from the access point, a channel may be selected if the uplink signal strength is greater than a specified threshold, without regard for the downlink signal strength.

The channel selection module 415 may apply a policy that selects a channel 115 based on a video codec used to encode video data. The channel selection module 415 receives an identification of the video codec from the video capture module 305 of the wireless device 120 and can select a channel based on the codec that was or will be used by the video capture module 305. To select the channel, the channel selection module 415 may look up attributes of the codec, such as a compression ratio, and select a channel 115 having properties that match the codec attributes. For example, the channel selection module 415 may select a high-capacity channel when transmitting data compressed by a codec that has a relatively low compression ratio (i.e., a size of the data after compression is a relatively high percentage of the data size before compression), whereas any channel may be selected if the video data is compressed by a codec with a high compression ratio.

The channel selection module 415 may apply a policy that selects a channel 115 based on a resolution of the video. A high capacity channel can be selected for a high-resolution video, whereas any channel may be selected for a lower-resolution video.

The channel selection module 415 may apply a policy that selects a channel 115 based on a duration of the video. The duration of videos transmitted by the wireless device 120 may be relatively similar. For example, the wireless device 120 may transmit a ten second video each time motion is detected. Accordingly, the channel selection module 415 can use a calculated mean or median video duration to select a channel 115. In one embodiment, if the duration of video data is less than a specified threshold, the channel selection module 415 may select a lower-capacity channel. A higher-capacity channel can be selected if the duration of the video data is greater than a specified threshold. Similarly, a lower-throughput channel can be selected if the wireless device 120 has enough available space to buffer the video data before transmitting it, whereas a higher-throughput channel can be selected if the wireless device 120 cannot buffer the video data. The wireless device 120 can be determined to have sufficient buffer space if the buffer is at least as large as the amount of video data (calculated based on the length of the video and the bit rate). Alternatively, the wireless device 120 can be determined to have sufficient buffer space if the buffer can hold at least a specified percentage of the video data (e.g., 75%).

The channel selection module 415 may apply a policy that selects a channel 115 based on a storage location of the video. As described above, video data may be stored locally on the wireless device 120, stored at the remote server 130, or streamed live to one or more other devices. For live streaming applications, in which a remote user may be viewing the video data in substantially real time while it is captured, a low latency channel may be preferred to a channel that has a higher latency. Accordingly, the channel selection module 415 may measure latency on one or more channels, and select a channel that has a latency below a specified threshold. The channel selection module 215 may additionally or alternatively may select a channel associated with a higher frequency band (e.g., a 5 GHz band) based on a determination that the higher frequency channel is likely to have lower latency than channels associated with a lower frequency band (e.g., a 2.4 GHz band).

The channel selection module 415 may apply a policy that selects a channel 115 based on a number of dropped data packets on a given channel. As the wireless device 120 transmits data to or receives data from the access point 110, the access point 110 and/or wireless device 120 may maintain a count of the dropped packets. If the number of dropped packets exceeds a threshold, the channel selection module 415 selects a different channel 115. The threshold may be defined for a total number of dropped packets on the channel or a rate of packet drop.

The channel selection module 415 may apply a policy that selects a channel 115 based on the availability of a DFS channel. As described above, the DFS channels are channels designated for use by radar systems. A protocol, such as IEEE 802.11, may define conditions under which consumer devices may use the DFS channels to communicate. These conditions include, for example, procedures for monitoring a DFS channel for signals transmitted by the radar systems, an amount of time provided to the consumer device to steer away from a DFS channel if a radar signal is detected, and an amount of time the consumer device must monitor the channel for radar signals before steering to the channel. A consumer device's ability to use a DFS channel may be conditioned upon compliance with the protocol.

The DFS channels may generally have a lower latency and a higher throughput than other channels, and therefore may be desirable for some types of data transmission. Accordingly, the channel selection module 415 may determine if a DFS channel is available, in compliance with the protocol. If a DFS channel is available, the channel selection module 415 may select the DFS channel over other channels. The channel selection module 415 may instead prioritize use of the DFS channel for applications that require high throughput or low latency. For example, if the data for transmission by the wireless device 120 is high resolution or is livestreamed to one or more other devices, the channel selection module 415 may select a DFS channel. If the data is lower resolution or is stored locally by the wireless device 120, the channel selection module 415 may select a non-DFS channel even if a DFS channel is available. Alternatively, the channel selection module 415 may make a determination that a particular wireless device 120 should not communicate via a DFS channel, for example to avoid delaying or losing part of the data stream from the device if a radar signal is detected and the device is forced to steer to a different channel.

In some cases, the channel selection module 415 may control an antenna of the access point 110 to determine the availability of DFS channels while the access point 110 is communicating with the wireless device 120 via another antenna. For example, if the protocol for the DFS channels specifies an amount of time the access point must listen for radar signals on a channel before communicating over the channel, the access point antenna can tune in to the channel and listen for the requisite amount of time. The protocol then may allow the access point 110 to communicate over the channel for a specified amount of time, such as one hour, before needing to listen again for radar signals. The antenna not used for communication with the wireless device 120 may iterate through multiple DFS channels, identifying any channels that are available and enabling the access point 110 to quickly steer a wireless device 120 to a DFS channel if there is a change to attributes of the data load or properties of another channel. In other cases, the channel selection module 415 may control an antenna to determine the availability of a DFS channel while the wireless device 120 is in the standby mode. For example, if the wireless device 120 is set to communicate with the access point 110 over a first channel, the antenna can be retuned to listen for radar signals on a DFS channel while the wireless device 120 is on standby mode. The antenna can then be retuned to the first channel until the wireless device 120 becomes active, and, if the DFS channel is available, used to steer the wireless device 120 to the DFS channel.

The channel selection module 415 may combine two or more of the policies described above to select a channel 115. That is, the channel selection module 415 may use two or more channel properties, or two or more video attributes, to select the channel. In case of conflicts between the policies, the channel selection module 415 may define a priority for the policies. For example, as described above, the channel selection module 415 may apply a first policy that selects a channel having a below-threshold latency for live-streaming applications and a second policy that selects a channel having an above-threshold capacity for high resolution data. If the wireless communication device 120 is transmitting high-resolution, live-streamed data, the policies applied by channel selection module 415 may conflict when selecting between a first channel that has both a latency and capacity below specified thresholds and a second channel that has a latency and capacity above the thresholds. In this case, the channel selection module 415 may apply a priority ordering to the policies to, for example, select the low latency channel for transmitting the data.

If the channel selected by the channel selection module 415 is different from a channel currently used to communicate with the wireless device 120, the access point 110 steers the wireless device 120 from the current channel to the selected channel.

Figure 5:
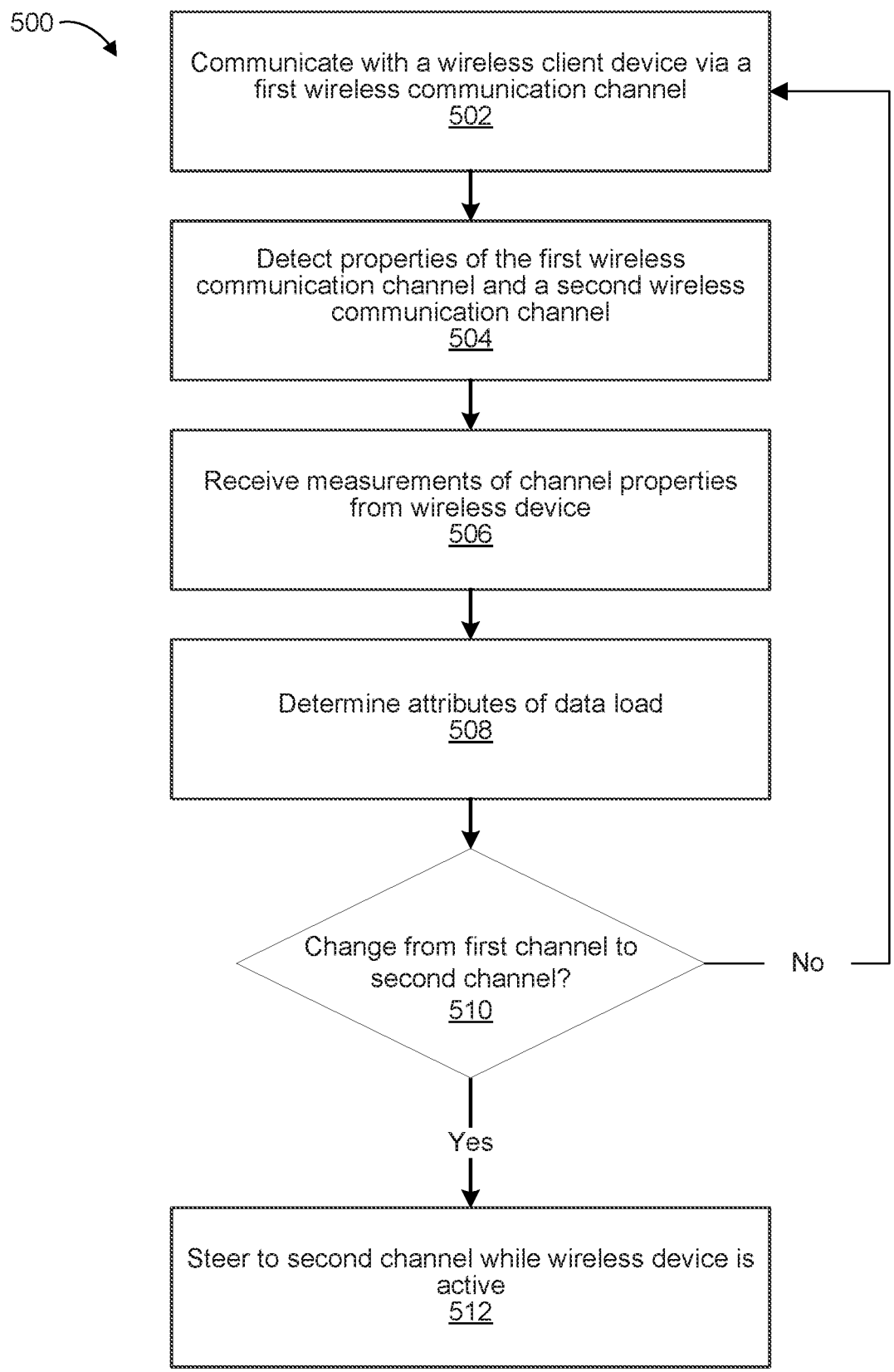
FIG. 5 is a flowchart illustrating a process for performing band steering for a low-power device, according to some embodiments.

FIG. 5 is a flowchart illustrating a process 500 for performing band steering for a low-power client device, according to one embodiment. The process 500 can be performed by the access point 110. Other embodiments of the process 500 may include different, additional, or fewer steps than shown in FIG. 5, and the steps may be performed in different orders.

As shown in FIG. 4, the access point 110 communicates 502 with the wireless device 120 over a first wireless communication channel. The communication can include, for example, video data captured by the wireless device 120 and sent to the access point 110 for transmission to the remote server 130.

The access point 110 detects 504 properties of at least the first channel and a second wireless communication channel. The channel properties may include, for example, an amount of interference on the channel, signal strength over the channel, a number of dropped packets on the channel, and capacity of the channel. The access point 110 can also receive 506 measurements of the channel properties from the wireless device 120. For example, the wireless device 120 may transmit to the access point 110 information about interference the wireless device measured on a channel.

The access point 110 determines 508 attributes of data that is to be transmitted over the channel from the wireless device 120 to the access point 110, including, for example, an amount of data or a storage location for the data. When the wireless device 120 includes a camera configured to capture video data, the wireless device 120 may determine the amount of data based on attributes such as the video codec used to compress the video data, a bit rate of the video, a resolution of the video, or a duration of the video.

The access point 110 determines 510 whether to change from the first channel to the second channel based on the properties of each channel and/or the data attributes. To select the channel, the access point 110 may apply one or more policies. A policy may specify a range of values for a channel property, such that application of the policy causes the access point 110 to select a channel that has a property within the specified range of values and not select a channel with a property outside the range of values. Other policies may specify that certain channel properties are suitable for particular attributes of the data that is to be transmitted. The access point 110 may apply one of these policies to select a channel that has one or more properties matching one or more attributes of the data, and not select a channel whose properties do not match the data attributes.

If the access point 110 determines that a channel switch is needed, the access point 110 steers the wireless device 120 to the second channel at a time when the wireless device 120 is active. That is, rather than waking the wireless device 120 from a standby state to switch from the first channel to the second channel, the access point 110 waits until the wireless device 120 becomes active (for example, when the wireless device 120 is triggered by a motion input, or at a predetermined wake interval). The wireless device 120 and access point 110 can then communicate over the second channel.

In some cases, the access point 110 may determine that the first or second channel should be changed to a third channel because properties of the first or second channel meet a specified criterion. For example, if an amount of interference measured on the first channel is greater than a threshold for longer than a specified length of time, the access point 110 may determine that a third channel should be used instead of the first channel. Similarly, if the first channel is a DFS channel, the access point 110 may switch to a third channel if a radar signal is detected on the DFS channel. When switching an antenna to communicate via a third channel instead of the first or second channel, the access point 110 can tune the antenna that was communicating over the first or second channel to the frequency associated with the third channel. When the channel associated with an antenna is switched, the access point 110 may send a channel switch announcement to any wireless devices communicating with the access point via the antenna. If a plurality of wireless devices are communicating via the antenna, the channel switch announcement may be sent to each of the wireless devices at different times. In one embodiment, the access point 110 may send the channel switch announcement to each wireless device when the device is in a standby state, ensuring that initial data (such as a first video frame) transmitted by the wireless device when the device becomes active is not missed. In another embodiment, the access point 110 sends the channel switch announcement when a wireless device is active, rather than waking the wireless device from the standby state.

Figure 6:
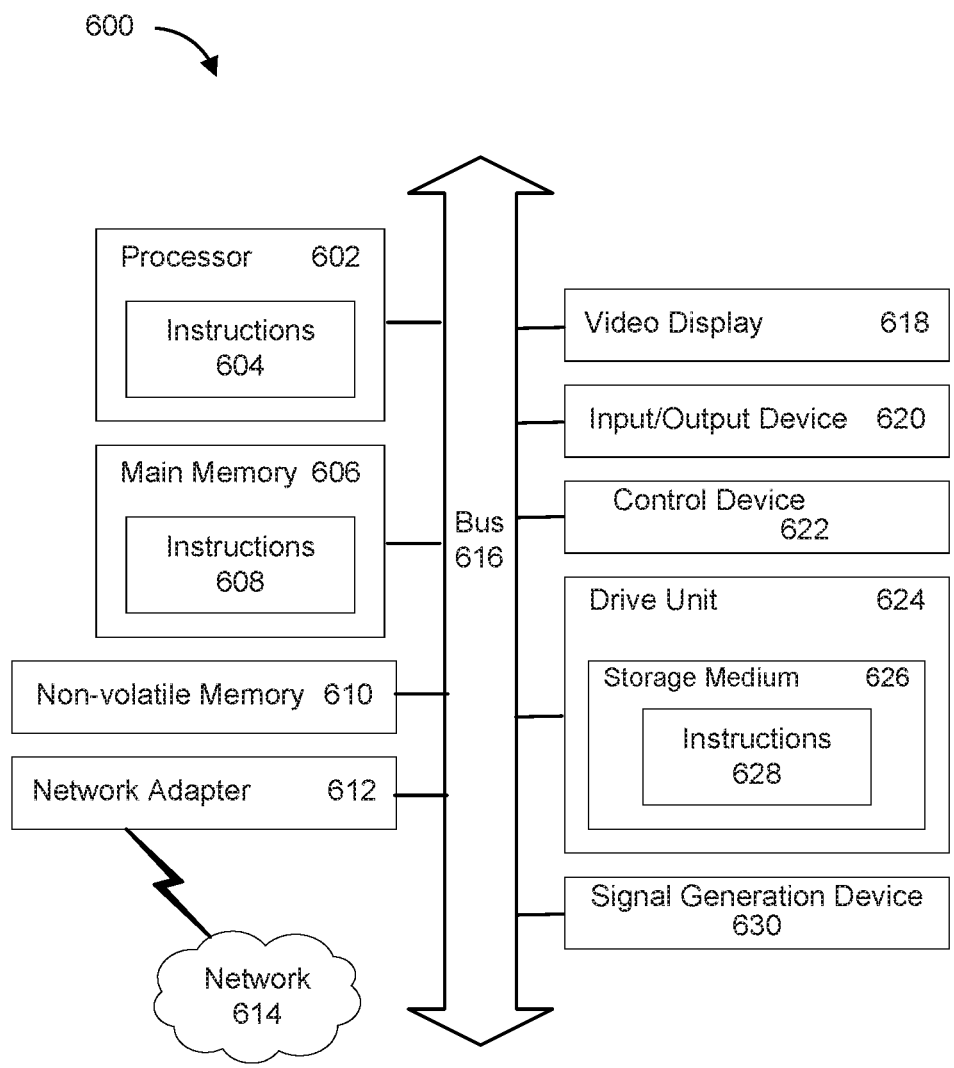
FIG. 6 is a block diagram illustrating an example processing system in which at least some operations described herein can be implemented.

FIG. 6 is a block diagram illustrating an example of a processing system 600 in which at least some operations described herein can be implemented. The processing system 600 may include one or more central processing units ("processors") 602, main memory 606, non-volatile memory 610, network adapter 612 (e.g., network interfaces), video display 618, input/output devices 620, control device 622 (e.g., keyboard and pointing devices), drive unit 624 including a storage medium 626, and signal generation device 630 that are communicatively connected to a bus 616. The bus 616 is illustrated as an abstraction that represents any one or more separate physical buses, point to point connections, or both connected by appropriate bridges, adapters, or controllers. The bus 616, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, also called "Firewire."

In various embodiments, the processing system 600 operates as part of a user device, although the processing system 600 may also be connected (e.g., wired or wirelessly) to the user device. In a networked deployment, the processing system 600 may operate in the capacity of a server or a client machine in a client-server network environment, or as a peer machine in a peer-to-peer (or distributed) network environment.

The processing system 600 may be a server computer, a client computer, a personal computer, a tablet, a laptop computer, a personal digital assistant (PDA), a cellular phone, a processor, a web appliance, a network router, switch or bridge, a console, a hand-held console, a gaming device, a music player, network-connected ("smart") televisions, television-connected devices, or any portable device or machine capable of executing a set of instructions (sequential or otherwise) that specify actions to be taken by the processing system 600.

While the main memory 606, non-volatile memory 610, and storage medium 626 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 628. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 604, 608, 628) set at various times in various memory and storage devices in a computer, and that, when read and executed by one or more processing units or processors 602, cause the processing system 600 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. For example, the technology described herein could be implemented using virtual machines or cloud computing services.

Further examples of machine-readable storage media, machine-readable media, or computer-readable (storage) media include, but are not limited to, recordable type media such as volatile and non-volatile memory devices 610, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 612 enables the processing system 600 to mediate data in a network 614 with an entity that is external to the processing system 600 through any known and/or convenient communications protocol supported by the processing system 600 and the external entity. The network adapter 612 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 612 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

It should also be understood that all block diagrams in the figures are for illustration purpose only, and should not preclude the scope of this invention to include any logic equivalents or combinations thereof, including removing, substituting, or adding other logic gates that achieves the same or similar functions consistent with the features of the present invention. Further, it should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media).

The invention claimed is:
1. A wireless access point comprising:
a radio antenna configured to communicate with a wireless client device by a first wireless communication channel or a second wireless communication channel, the wireless client device having an operating state including an active operation state and a standby operation state; and
a processor coupled to the radio antenna and configured to:
receive the operating state from the wireless client device;
while the wireless client device is in the standby operation state, detect a property of each of the first wireless communication channel and the second wireless communication channel;

apply a policy to the detected properties to select one of the first wireless communication channel and the second wireless communication channel; and determine, based on the operating state of the wireless client device, whether to steer the wireless client device to communicate via the selected channel.

2. The wireless access point of claim 1, wherein said detecting the property of the wireless channels is performed when the wireless client device is in the standby operation state.

3. The wireless access point of claim 1, wherein the processor is configured such that only when the wireless client device is in the active operation state does the processor steer the wireless client device to the selected channel for communication.

4. The wireless access point of claim 1, wherein the property is an amount of interference measured on each of the first wireless communication channel and the second wireless communication channel, and wherein the policy when applied causes the processor to select the first wireless communication channel responsive to the amount of interference measured on the second wireless communication channel exceeding a threshold.

5. The wireless access point of claim 1, wherein the wireless client device comprises a camera to capture video data, and wherein the processor is further configured to:
receive an attribute of the video data captured by the wireless client device; and
select one of the first wireless communication channel and the second wireless communication channel further based on the received attribute.

6. The wireless access point of claim 1, wherein the processor is further configured to:
receive from the wireless client device, a measurement of the property of each of the first wireless communication channel and the second wireless communication channel; and
apply the policy to the received measurements to select one of the first wireless communication channel and the second wireless communication channel further based on the received measurements.

7. The wireless access point of claim 1, wherein the first wireless communication channel is a dynamic frequency selection (DFS) channel designated for use by radar systems, and wherein the processor is further configured to:
monitor the first wireless communication channel using the radio antenna for a radar signal; and
responsive to detecting the radar signal, selecting the second wireless communication channel.

8. The wireless access point of claim 1, wherein the first wireless communication channel is a DFS channel designated for use by radar systems, and wherein the processor is further configured to:
while the wireless access point is set to communicate with the access point over the second wireless communication channel, tuning the radio antenna to each of a plurality of DFS channels;
monitoring each of the plurality of DFS channels for a radar signal; and
responsive to not detecting the radar signal on one of the channels within a specified time period, selecting the channel as the first wireless communication channel.

9. The wireless access point of claim 1, wherein the processor is further configured to:
responsive to detecting a property of the first communication channel meets a specified criterion, switching the radio antenna to communicate with the wireless client device by a third wireless communication channel.

10. The wireless access point of claim 9, wherein the radio antenna communicates with a plurality of other wireless client devices, and wherein the processor is further configured to:
transmit a channel switch announcement to a first wireless client device of the plurality of other wireless client devices when the first wireless client device is in an active state; and
transmit the channel switch announcement to a second wireless client device of the plurality of other wireless client devices when the second wireless client device is in an active state.

11. The wireless access point of claim 9, wherein the radio antenna communicates with a plurality of other wireless client devices, and wherein the processor is further configured to:
transmit a channel switch announcement to a first wireless client device of the plurality of other wireless client devices when the first wireless client device is in a standby state; and
transmit the channel switch announcement to a second wireless client device of the plurality of other wireless client devices when the second wireless client device is in a standby state.

12. The wireless access point of claim 1, wherein the processor is further configured to:
identify an amount of available buffer space on the wireless client device and an amount of data to be transmitted; and
apply a policy to the amount of available buffer space and amount of data to select one of the first wireless communication channel and the second wireless communication channel further based on the identified amounts.

13. The wireless access point of claim 1, wherein the processor is further configured to:
use a machine learning module to generate a prediction of an amount of interference on each of the first wireless communication channel and the second wireless communication channel at a specified time; and
at the specified time, apply a policy to the predicted amount of interference to select one of the first wireless communication channel and the second wireless communication channel further based on the prediction.

14. The wireless access point of claim 1, wherein the wireless client device comprises a motion sensor, and wherein the wireless client device is configured to switch from the standby operation state to the active operation state in response to a motion signal detected by the motion sensor.

15. A method comprising:
receiving at a wireless access point, an operating state from a wireless client device, the wireless access point having a radio antenna configured to communicate with the wireless client device by a first wireless communication channel or a second wireless communication channel, and the operating state of the client device including an active operation state or a standby operation state;
while the wireless client device is in the standby operation state, detecting by the wireless access point, a property of each of the first wireless communication channel and the second wireless communication channel;

applying a policy to the detected properties, by the wireless access point, to select one of the first wireless communication channel and the second wireless communication channel; and determining by the wireless access point, based on the operating state of the wireless client device, whether to steer the wireless client device to communicate via the selected channel.

16. The method of claim 15, further comprising steering the wireless client device to the selected channel only when the wireless client device is in the active operation state.

17. The method of claim 15, wherein the wireless client device comprises a camera to capture video data, and wherein the method further comprising:

receiving at the wireless access point, an attribute of the video data captured by the wireless client device; and selecting, by the wireless access point, one of the first wireless communication channel and the second wireless communication channel further based on the received attribute.

18. A wireless access point comprising:

a radio antenna configured to communicate with a wireless client device by a first wireless communication channel or a second wireless communication channel, the wireless client device having an operating state including an active operation state and a standby operation state; and a processor coupled to the radio antenna and configured to:

receive the operating state from the wireless client device;

detect a property of each of the first wireless communication channel and the second wireless communication channel, wherein detecting the property is performed when the wireless client device is in the standby operation state;

apply a policy to the detected properties to select one of the first wireless communication channel and the second wireless communication channel;

determine, based on the operating state of the wireless client device, whether to steer the wireless client device to communicate via the selected channel; and if the processor determines to steer the wireless client device to communicate via the selected channel, steering the wireless client device to the selected channel when the wireless client device is in the active operation state.

19. The wireless access point of claim 18, wherein the property is an amount of interference measured on each of the first wireless communication channel and the second wireless communication channel, and wherein the policy when applied causes the processor to select the first wireless communication channel responsive to the amount of interference measured on the second wireless communication channel exceeding a threshold.

20. The wireless access point of claim 18, wherein the wireless client device comprises a camera to capture video data, and wherein the processor is further configured to:

receive an attribute of the video data captured by the wireless client device; and select one of the first wireless communication channel and the second wireless communication channel further based on the received attribute.

* * * * *